(12) United States Patent
Kolberg et al.

(10) Patent No.: US 7,219,424 B2
(45) Date of Patent: May 22, 2007

(54) METHOD FOR TEMPORARY REPAIR OF THE OVERBRAID FOR METAL OVERBRAIDED WIRING HARNESSES

(75) Inventors: Tony Kolberg, Tempe, AZ (US); William D. Scarry, Peoria, AZ (US)

(73) Assignee: Honeywell International, Inc., Morristown, NJ (US)

( * ) Notice: Subject to any disclaimer, the term of this patent is extended or adjusted under 35 U.S.C. 154(b) by 460 days.

(21) Appl. No.: 10/799,454

(22) Filed: Mar. 11, 2004

(65) Prior Publication Data

US 2005/0198820 A1    Sep. 15, 2005

(51) Int. Cl.
*H01R 43/00* (2006.01)

(52) U.S. Cl. ............. 29/868; 29/402.01; 29/402.09; 29/825; 29/828; 156/49; 156/94; 156/188; 174/36

(58) Field of Classification Search ............ 29/868, 29/402.01, 402.09, 825, 828; 156/49, 94, 156/188; 174/36

See application file for complete search history.

(56) References Cited

U.S. PATENT DOCUMENTS

| 3,569,608 | A |   | 3/1971  | Ance             |        |
|-----------|---|---|---------|------------------|--------|
| 4,283,238 | A | * | 8/1981  | Jacquemart       | 156/49 |
| 4,512,833 | A | * | 4/1985  | Kridl et al.     | 156/94 |
| 4,804,806 | A |   | 2/1989  | Orr et al.       |        |
| 5,854,444 | A |   | 12/1998 | Fehlhaber        |        |
| 5,973,265 | A |   | 10/1999 | O'Brien et al.   |        |
| 6,143,986 | A |   | 11/2000 | Anderson et al.  |        |

* cited by examiner

*Primary Examiner*—A. Dexter Tugbang
*Assistant Examiner*—Tim Phan
(74) *Attorney, Agent, or Firm*—Ingrassia Fisher & Lorenz

(57) ABSTRACT

A method for the repair of the overbraid for metal overbraided wiring harness is provided. The method requires no special wiring harness design, uses readily available materials and can be accomplished without removing the wiring harness. The method involves trimming around the damaged area, spreading the braid to expose a repair area, covering the repair area with a metal cover and then covering the repair area with wire screen mesh. Finally, the mesh is secured onto the wiring harness. Also provided is a metal overbraid wiring harness having been repaired with the method of the present invention.

17 Claims, 11 Drawing Sheets

METHOD FOR TEMPORARY REPAIR OF THE OVERBRAID FOR METAL OVERBRAIDED WIRING HARNESSES

BACKGROUND OF THE INVENTION

This invention relates generally to methods of repairing electrical wiring harnesses and, more specifically, to methods of repairing the overbraid for metal overbraided wiring harnesses.

Wiring harnesses are used in the operation of most engines to electrically couple the engine and associated equipment to one another. In aircraft jet engines, the wiring of the harnesses is often protected by an outer metal overbraid. Although satisfactory as installed, the high temperature, high vibration and associated chafing conditions experienced by the electrical harnesses during engine operation tend to cause the metal overbraid to become worn or frayed. Currently, it is difficult to repair a damaged wiring harness in the field, particularly without removing the harness from the engine for, what is commonly known as, "on wing" repairs. When damaged the harness is usually removed for repair and then replaced. This procedure is expensive and results in downtime for the aircraft.

Methods for splice repair of electrical wiring harnesses are known in the art. U.S. Pat. No. 6,143,986 describes an electrical wiring harness having at least one repair splice means at pre-defined locations in the harness and at predetermined distances from the backshell. The repair splice means allows for easy repair without removing the harness from the engine. However, although repairs may be made on wing, the specific harness of the '986 patent is required. Moreover, it only allows for repairs around the backshell terminations and not mid-span of the harness wiring.

U.S. Pat. No. 5,854,444 discloses a splice kit for repairing shielded cable. The kit comprises crimp ferules and a shielding sleeve to use for splicing together damaged cable. The crimp ferules are applied on either side of the splice site to prevent further unraveling of the wire shielded braid. The central conductor is then spliced together using crimp-type conductor splices. Finally, the repaired portion of the central conductor is protected by placing a preformed shield seal sleeve around the spliced shielded wire. However, repairs by this method are limited by the availability of the kit. Moreover, often times only the overbraid is damaged and in need of repair without requiring splicing of the central conductor.

As can be seen, there is a need for a simple method to repair the overbraid of metal overbraided wiring harnesses that can be accomplished easily with materials that are readily available. It would be advantageous to have a method which allows for 'on-wing' repair of the harness eliminating having to remove it from the engine.

SUMMARY OF THE INVENTION

In one aspect of the present invention, there is provided a method of repairing a metal overbraid of a metal overbraid wiring harness comprising the steps of trimming a damaged area of the overbraid circumferentially around the harness to expose a repair area, wherein the damaged area is in a part of the metal overbraid that is single braided, moving the metal overbraid away from the repair area, covering the repair area with an electrically conductive material, moving the metal overbraid over the electrically conductive material, overlaying the repair area with a wire screen mesh, wherein the repair area is completely covered by the wire screen mesh and securing the wire screen mesh to the overbraid harness. The electrically conductive material may be any material that has conductivity substantially similar to that of the metal overbraid.

In another aspect of the invention, there is provided a method for repairing the metal overbraid of a metal overbraid wiring harness comprising the steps of trimming a damaged area of the overbraid circumferentially around the harness to expose a repair area, wherein the damaged area is at least 0.5 inches from a double braid overlap, wrapping tape around the metal overbraid on both sides of the repair area, spreading the metal overbraid from the repair area to the tape, moving the spread overbraid away from the repair area, covering the repair area with a metal cover, wherein the metal cover covers the entire repair area, moving the spread overbraid over the metal cover, overlaying the repair area with a wire screen mesh, wherein the metal strands are completely covered by the wire screen mesh so that the spread overbraid is completely covered and securing the wire screen mesh to the overbraid harness. The wire mesh screen can be secured to the metal overbraid harness by wrapping heat shrink tape over both ends of the wire screen mesh and heating to shrink the tape in place. The metal cover is any metal material that has conductivity substantially similar to the metal overbraid.

In yet another aspect of the present invention, there is provided a method for repairing a metal overbraid of a metal overbraid wiring harness comprising the steps of trimming a damaged area of the metal overbraid circumferentially around the harness to expose a repair area, wherein the damaged area is at least 0.5 inches from a double braid overlap, wrapping tape around the harness from about 0.5 inches to about 1.0 inches from both sides of the repair area, spreading the metal overbraid into metal strands from the repair area to the tape, folding back the metal strands away from the repair area and over the tape, covering the repair area with metal tape wherein the metal tape covers the entire repair area, folding the metal strands of the spread overbraid back over the metal cover, removing the tape from the overbraid harness, overlaying the repair are with a wire screen mesh, wrapping a shrink tape over both ends of the wire screen mesh and heating the shrink tape to secure the wire screen mesh to the overbraid harness.

In a further aspect of the invention there is provided a method for repairing a metal overbraid of a metal overbraid wiring harness without having to remove said metal overbraid wiring harness from an engine, comprising the steps of trimming a damaged area of the metal overbraid circumferentially around the harness to expose a repair area, wherein the damaged area is in a single overbraid portion of the metal overbraid, wrapping tape around the metal overbraid on both sides of the repair area, spreading the metal overbraid from the repair area to the tape, moving the spread overbraid away from the repair area, covering the repair area with a metal cover wherein the metal cover covers the entire repair area, moving the spread overbraid over the metal cover, removing the tape from the metal overbraid, overlaying the repair area with a wire screen mesh wherein the spread overbraid is completely covered, and securing the wire screen mesh to the metal overbraid wiring harness.

In a another aspect of the invention there is provided a metal overbraid wiring harness having a repaired damaged area in the metal overbraid, wherein the damaged area is at least 0.5 inches from a double braid overlap, the damaged area being repaired by trimming the damaged area of the overbraid circumferentially around the harness to expose a repair area, wrapping tape around the harness on both sides of the repair area, spreading the metal overbraid into metal strands from the repair area to the tape, folding back the metal strands away from the repair area and over the tape, covering the repair area with a metal cover wherein the metal cover covers the entire repair area, folding the metal strands over the metal cover, removing the tape from the overbraid harness, overlaying the repair with a wire screen mesh wherein the metal strands are completely covered and securing the wire screen mesh to the overbraid harness. The damaged area may be an abrasion to or a hole in the metal overbraid. The repaired metal overbraid wiring harness has substantially the same flexibility and electrical resistance of an undamaged metal overbraid wiring harness.

In yet another aspect of the invention, there is provided an engine having a metal overbraid wiring harness, in which said harness has a repaired damaged area in the metal overbraid, said damaged area being repaired by trimming a damaged area of the overbraid circumferentially around the harness to expose a repair area, wherein the damaged area is in a part of the metal overbraid that is single braided, wrapping tape around the metal overbraid on both sides of the repair area, moving the metal overbraid away from the repair area, covering the repair area with an electrically conductive material, moving the metal overbraid over the electrically conductive material, removing the tape from the metal overbraid, overlaying the repair area with a wire screen mesh wherein the overbraid is completely covered by the wire screen mesh and securing the wire screen mesh to the overbraid harness.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention provides a method for repairing a metal overbraid of a metal overbraid wiring harness. The method comprises the steps of trimming a damaged area of the overbraid circumferentially around the harness to expose a repair area, wherein the damaged area is in a part of the metal overbraid that is single braided, moving the metal overbraid away from the repair area, covering the repair area with an electrically conductive material, moving the metal overbraid over the electrically conductive material, overlaying the repair area with a wire screen mesh, wherein the repair area is completely covered by the wire screen mesh and securing the wire screen mesh to the overbraid harness. The present method allows for repair of a damaged wiring harness in the field, without having to remove the wiring harness. The method can be used with any engine that has a metal overbraid wiring harness. It is contemplated that the primary use would be in the aviation industry.

The present invention, in contrast to the prior art, provides a method for repairing a metal overbraid of a metal overbraid wiring harness using readily available materials. Repairs to the metal overbraid can therefore be made whenever and wherever required without needing a pre-assembled kit. Moreover, the method can be used with any metal overbraid wiring harness and does not require a special harness with repair features pre-installed. The harness of the prior art having pre-installed repair features allow for repair at the harness junctions only whereas with the method of the present invention repairs can be made to the metal overbraid in the single braid portion away from the harness junctions. Another advantage of the present invention is the ability to repair the metal overbraid of a metal overbraid wiring harness without having to remove the wiring harness. The result is less downtime for the aircraft or any other engine being repaired. Cost is also reduced since the overbraid of the wiring harness does not need to be removed to be rebraided and the materials are inexpensive.

Figure 1:
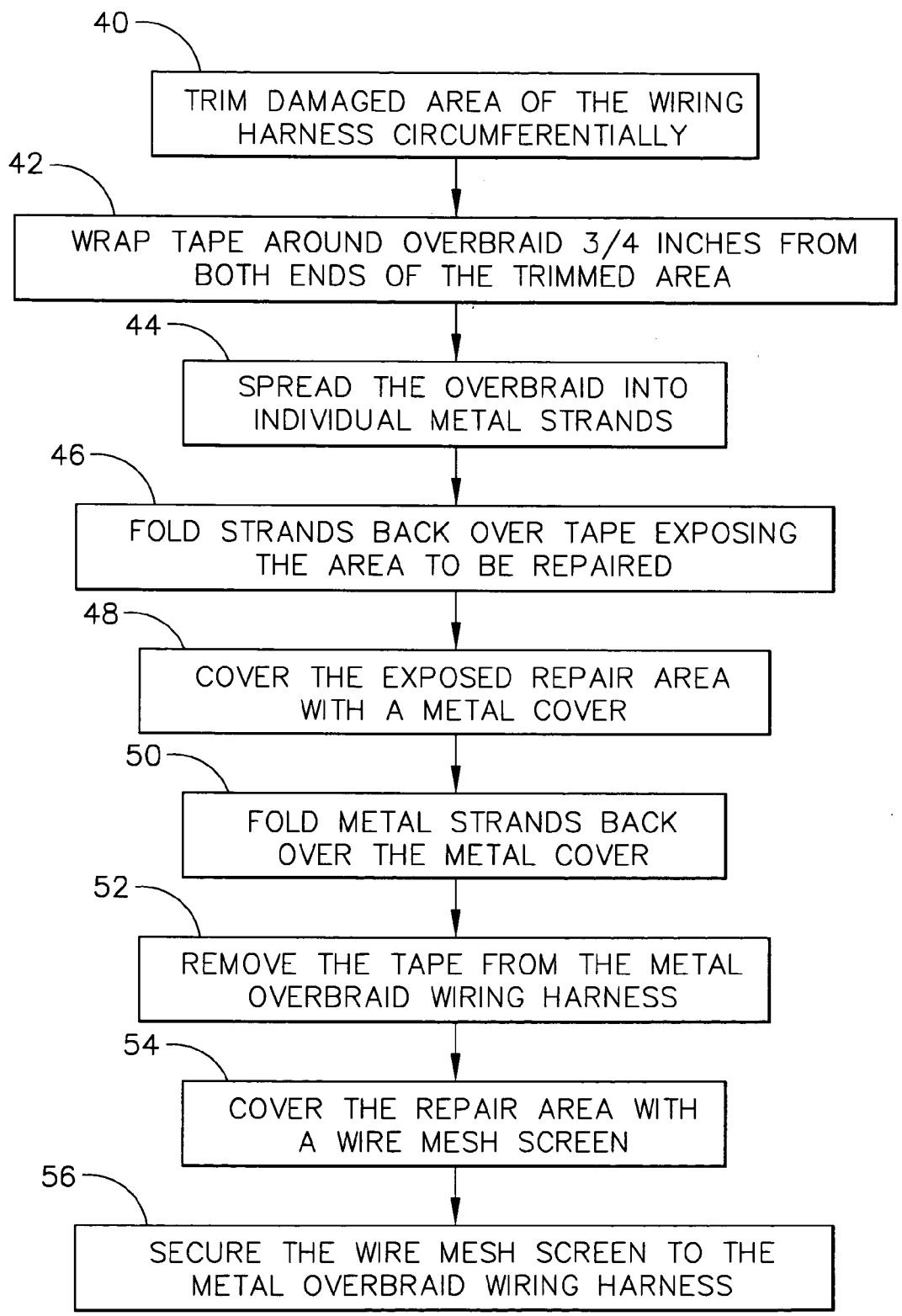
FIG. 1 is a flow diagram of a method for repairing the metal overbraid of a metal overbraid wiring harness.

The present invention provides a method for repairing the metal overbraid of a metal overbraid wiring harness. An exemplary method of the present invention may comprise the steps shown in the flow diagram of FIG. 1. The first step 40 comprises circumferentially trimming the metal overbraid around the damaged area. In the second step 42 tape may be wrapped around the metal overbraid at a distance of from about 0.5 inches to about 1.0 inches, for example, from both edges of the repair area. In step three 44 of the present invention, the metal overbraid may be spread apart from the trim area to the tape producing individual metal strands. The metal strands may then be folded back over the tape, leaving a clear repair area in the fourth step 46. In step five 48, a metal cover may then be placed over the repair area, completely covering the exposed inner harness bundle. In the next step, step six 50 the strands may then be folded back over the repair area, trimming the ends if necessary. Step seven 52 comprises removing the tape followed by step eight 54 where a wire mesh screen may be placed over the repair area. Finally, in step nine 56, the repair may be completed by securing the wire screen mesh to the metal overbraid wiring harness. The repaired part of the harness should have about the same conductivity and flexibility as the undamaged metal overbraid.

Figure 2:
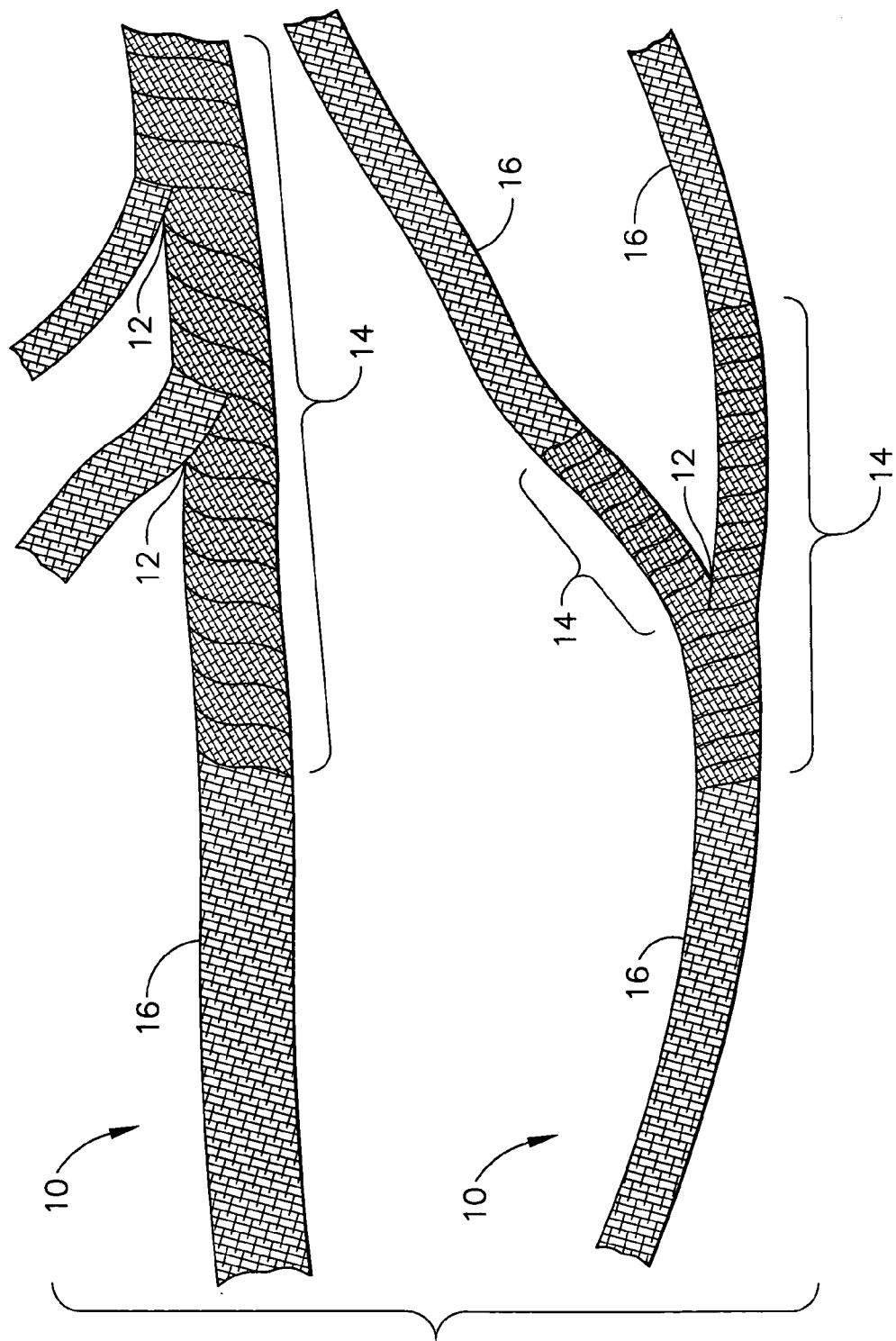
FIG. 2 illustrates a metal overbraid wiring harness.

As shown in FIG. 2, a metal overbraid wiring harness 10 may have a plurality of harness junctions 12. The metal overbraid on either side of the harness junction 12 may comprise a double braid overlap 14, where the double braid overlap 14 is from about 0.5 inches to about 1.5 inches from the harness junction 12. Any damage to the double braid overlap 14 of the harness may require that the harness be removed and rebraided. If the damage, however, is in the single overlap region of the metal overbraid 16, the present method may be used to repair the damage. Therefore, by way of non-limiting example, the damage should be at least about 0.5 inches from the double braid overlap 14 in order to use the repair method of the present invention. It will be appreciated that the distance of the damage from the harness junction 12 and/or double braid overlap 14 may depend on the individual harness to be repaired. The present method may be applicable when the damage is in the single overbraid portion of the metal overbraid wiring harness 10 and there may be sufficient distance from the double braid overlap 14 to make the repair.

Figure 3:
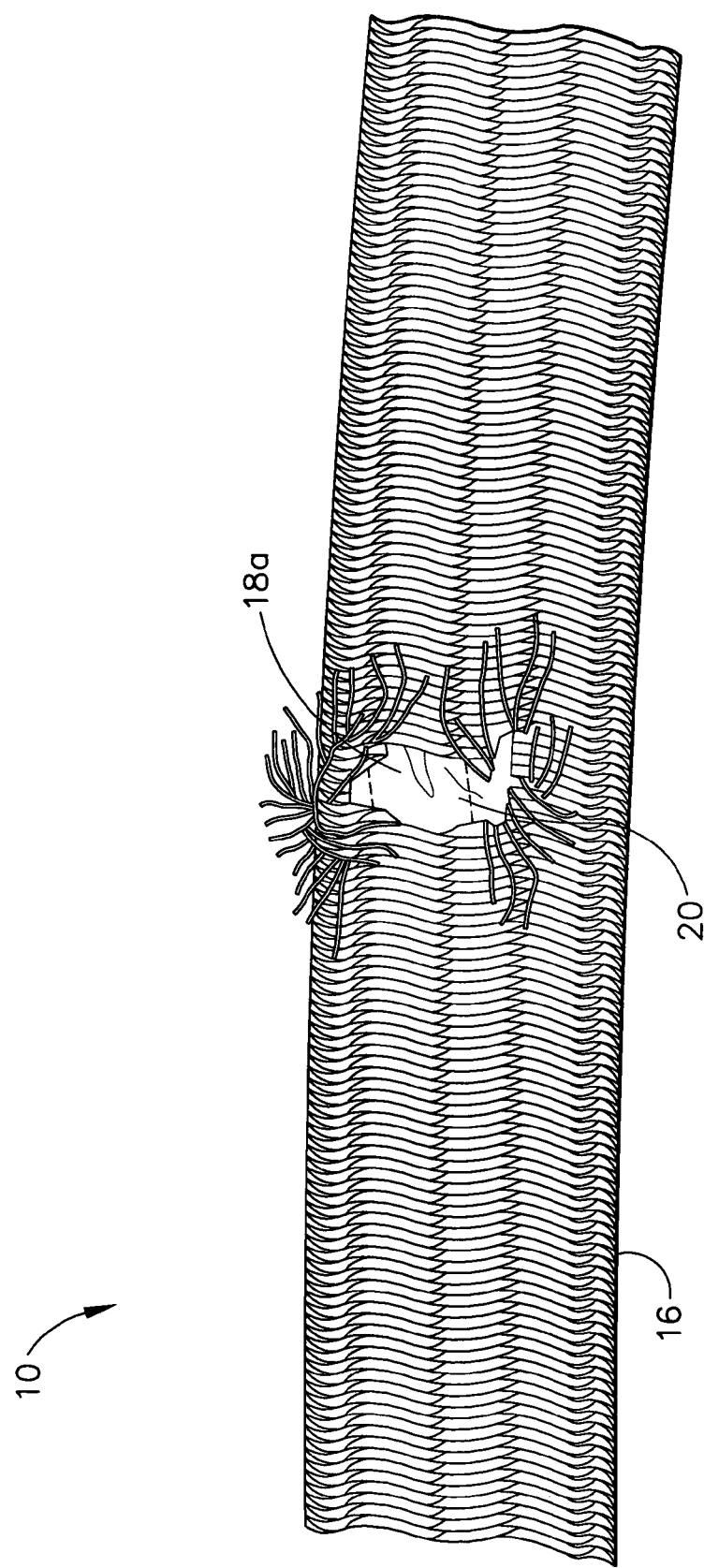
FIG. 3 illustrates damage to the metal overbraid of a metal overbraid wiring harness.

The damage to the metal overbraid may be any damage that threatens the integrity of the wiring harness. The damage may be a hole in the metal overbraid or a frayed area of the overbraid, with the potential for forming a hole in the overbraid. As shown in FIG. 3, damage to the wiring harness 10 may be a hole 18a in the metal overbraid 16 exposing the inner harness bundle 20.

Figure 4:
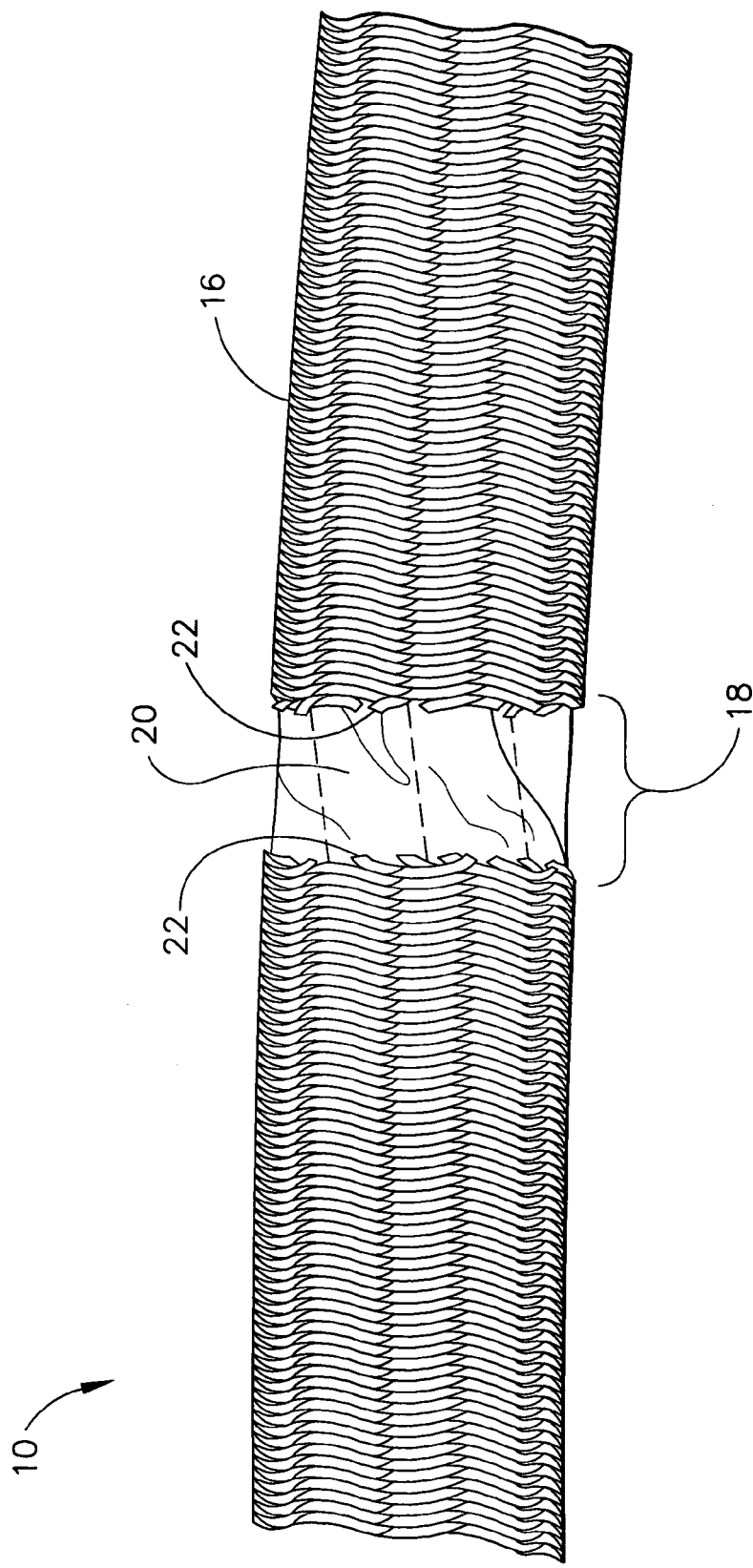
FIG. 4 illustrates a metal overbraid wiring harness where the damaged area of the overbraid has been trimmed.
Figure 5:
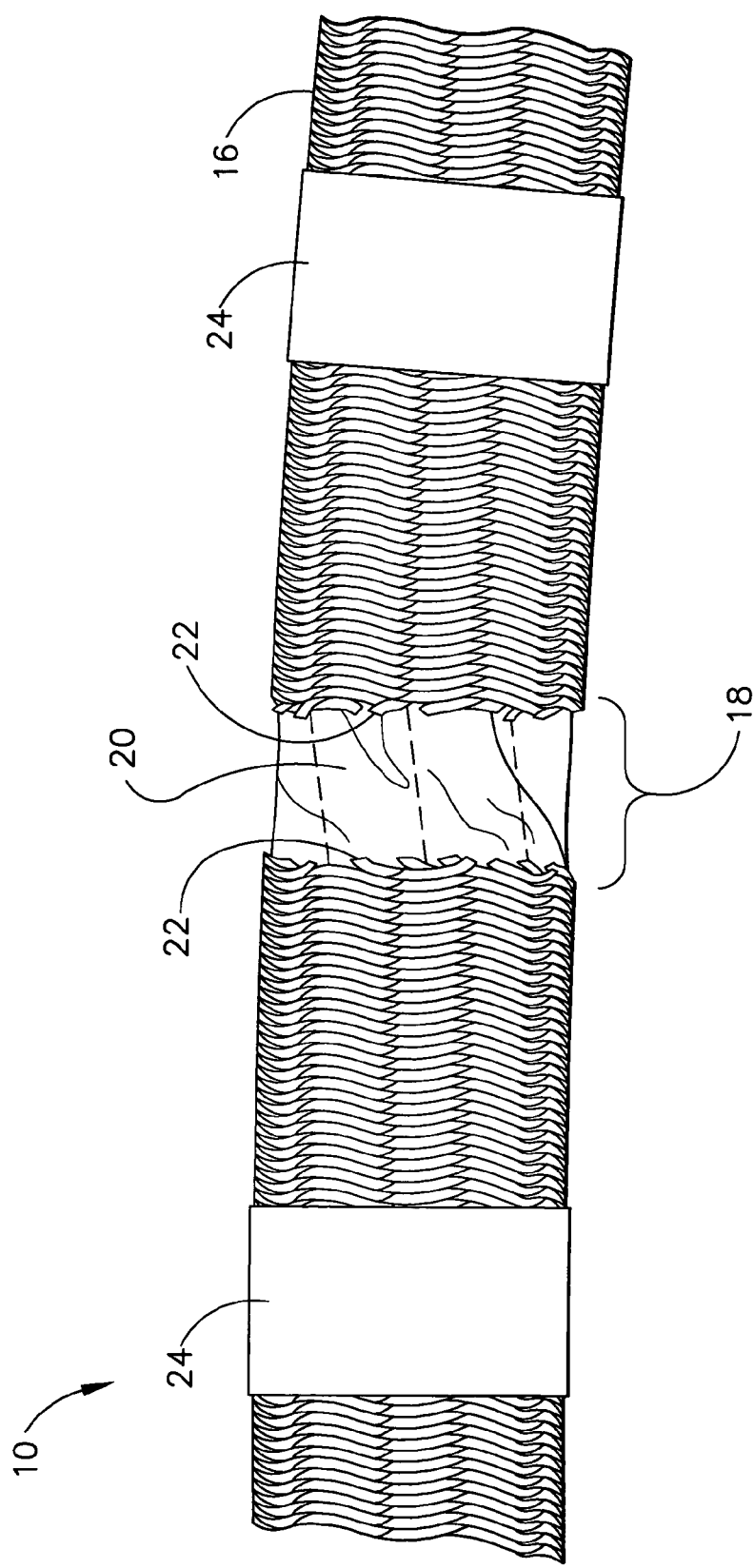
FIG. 5 illustrates a metal overbraid wiring harness where tape has been applied to the metal overbraid on both ends of a trimmed repair area.

FIGS. 4–11 help to illustrate the method of the present invention. The damaged area of the metal overbraid should be free of oils, grease and/or fuel. In the first step 40, the damaged area of the metal overbraid 16 may be trimmed circumferentially, producing a repair area 18 with an exposed inner harness bundle 20 (FIG. 4). A minimal amount of the overbraid 16 may be trimmed. In one embodiment of the present invention, the repair area 18 of the metal overbraid 16 may be up to about 2 inches. In a further embodiment, the repair area 18 may be from about 0.5 inches to about 2.0 inches. Care should be taken not to damage the inner harness bundle 20. Any tool, such as but not limited to, wire cutters may be used to trim the metal overbraid 16. After the damaged area has been trimmed, tape 24 may be wrapped around the metal overbraid 16 in the second step 42 of the present method. The tape 24 may be wrapped at a distance from both ends 22 of the repair area 18 sufficient to allow the placement of a metal cover 30 (see FIG. 8) in the repair area 18, typically from about 0.5 inches to about 1.0 inches from both ends 22 of the repair area (FIG. 5). In one embodiment, the tape 24 is wrapped about 0.75 inches from both ends 22 of the repair area 18. Any tape that is removable and will prevent the overbraid from fraying may be used, such as, but not limited to, masking tape. It will be appreciated that the method of the present invention may be practiced without using the tape 24. The tape 24 is used as a guide to help in the repair of the metal overbraid 16 and helps to facilitate the method. Wrapping tape 24 around the metal overbraid 16 may prevent an excessive amount of unraveling of the metal overbraid 16. Therefore, any device, such as a metal or plastic band, that works the same as the tape, may be used. Alternatively, if the tape is not applied, extra care should be taken so that the overbraid does not unravel more than from about 0.5 inches to about 1.0 inches from the ends 22 of the repair area 18.

Figure 6:
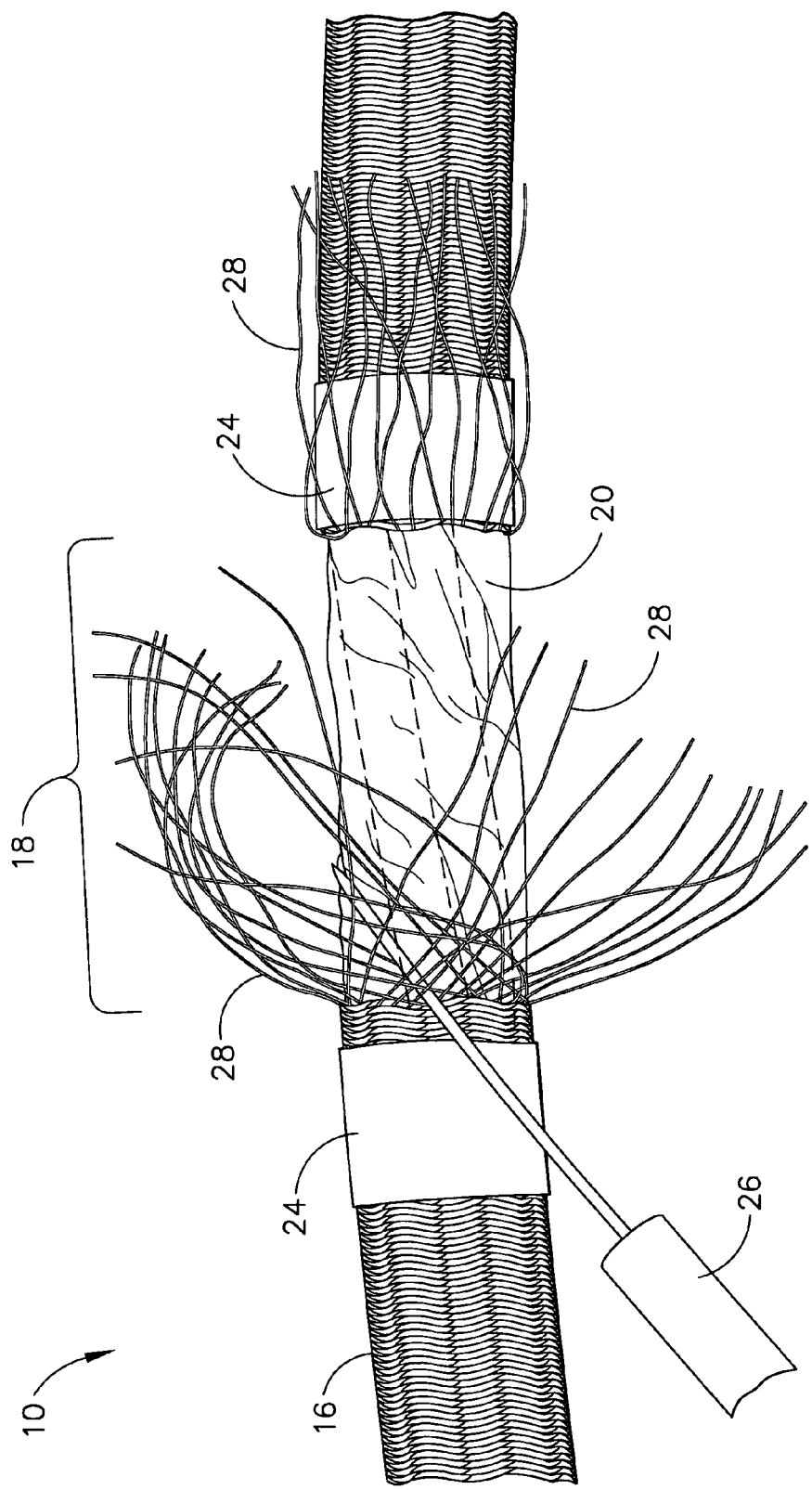
FIG. 6 illustrates a metal overbraid wiring harness where the metal overbraid has been spread to form individual metal strands.
Figure 7:
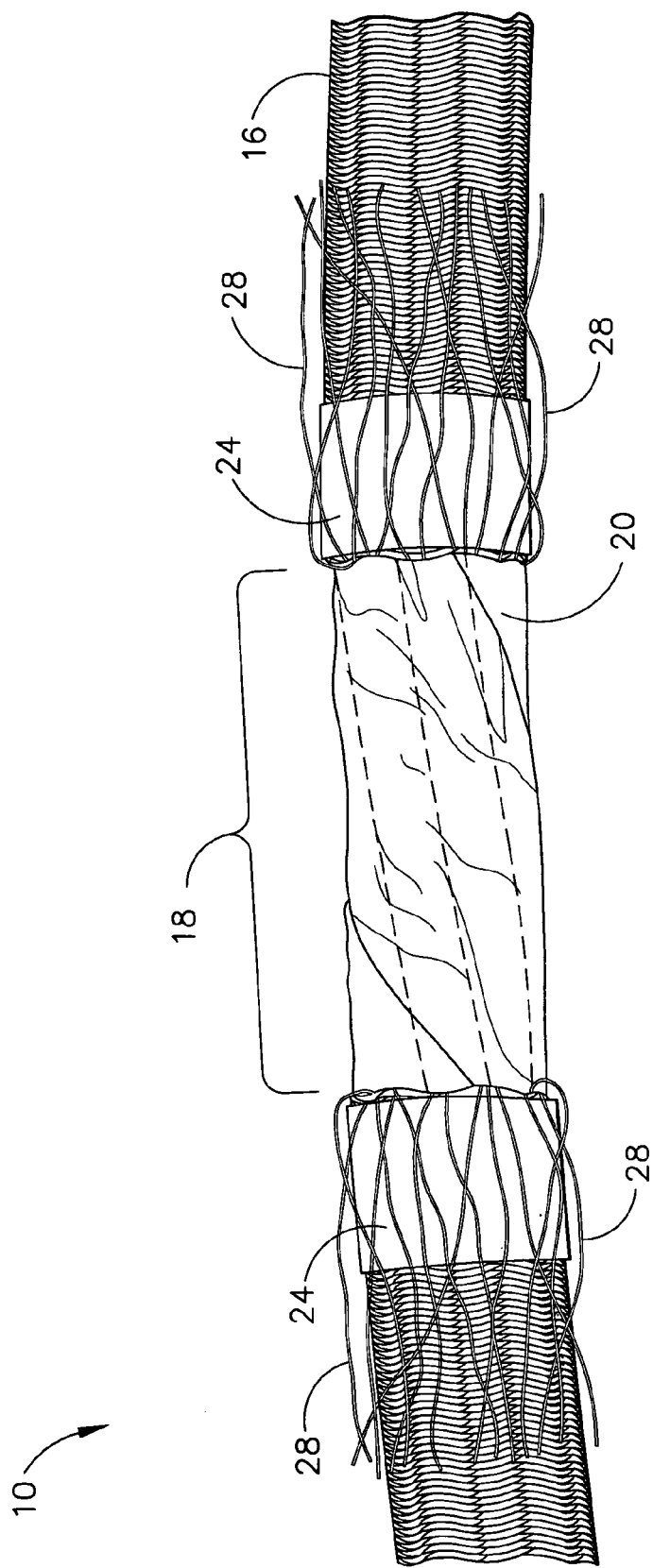
FIG. 7 illustrates a metal overbraid wiring harness where a repair area is exposed by folding back the metal strands of a spread metal overbraid.

In the next step of the repair method the metal overbraid 16 on either side of the repair area 18 may be moved away from the trimmed repair area 18. As illustrated in FIG. 6, step three 44 of FIG. 1, in which the metal overbraid 16 may be to spread from the ends 22 of the trimmed repair area 18 to the tape 24 may be used to aid in moving the metal overbraid 16 from repair area 18. Spreading of the metal overbraid 16 may produce individual metal strands 28 that make up the braid. Spreading of the metal overbraid 16 may be done using a teasing needle 26 or an orange stick (not shown). It will be appreciated that any tool with a pointed end may be used to spread the metal overbraid 16. If no tape is present, then the overbraid may be spread from about 0.5 inches to about 1.0 inches from the ends 22 of the repair area 18 or an amount sufficient to produce a repair area that may be readily repaired. Once spread, the next step, step four 46, may be folding the individual metal strands 28 back over the tape 24 and away from the repair area 18, exposing the inner harness bundle 20 as shown in FIG. 7.

Figure 8:
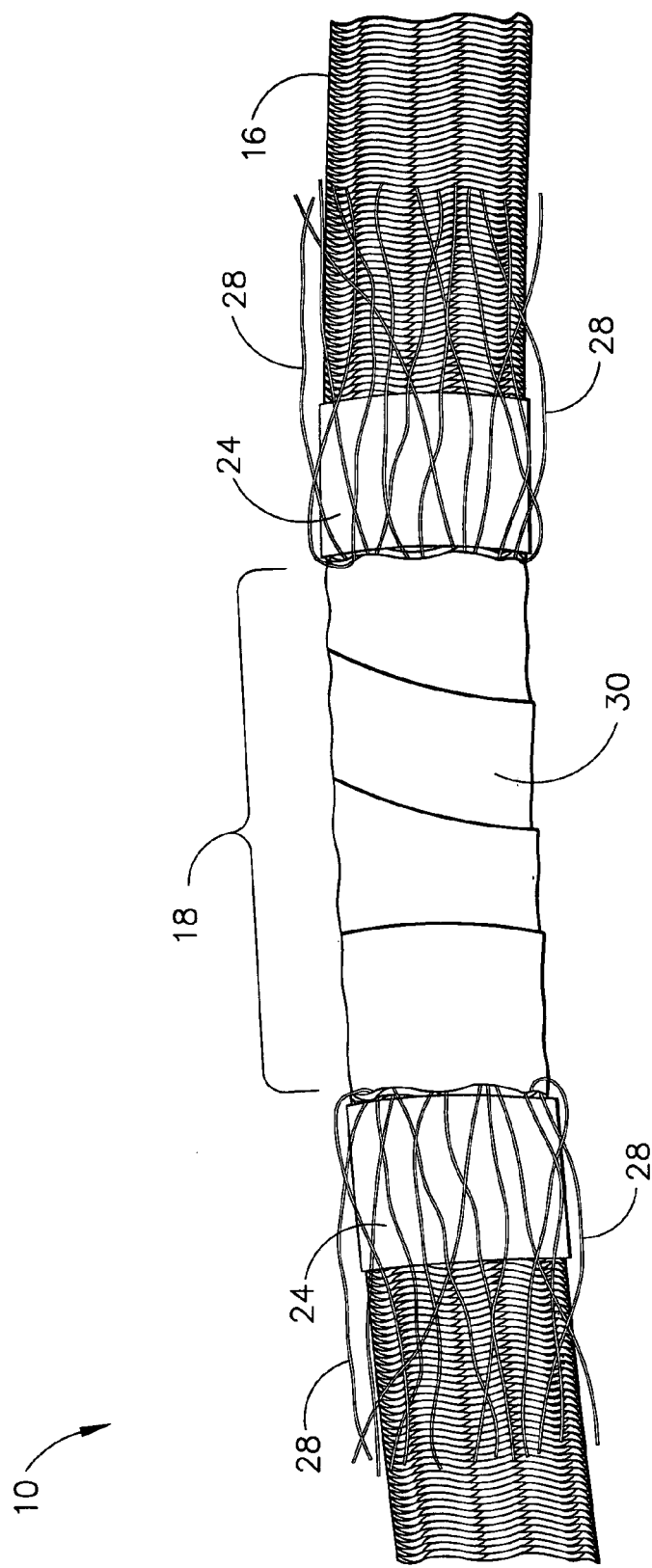
FIG. 8 illustrates a metal overbraid wiring harness where the repair area is covered by metal tape.

In the next step, step five 48, an electrically conductive material may then be placed over the repair area. By way of non-limiting example, a metal cover 30 may then be applied to the repair area 18. The metal cover 30 may cover the repair area 18 completely, with no metal strands 28 caught under the metal cover 30 (FIG. 8). The electrically conductive material, including metal cover 30, is any material that has conductivity substantially similar to that of the metal overbraid 16. By substantially similar, it is meant that the conductivity of the electrically conductive material should vary by no more than about 5% from the overbraid material. Non-limiting examples of electrically conductive materials are metal foil tape and tin foil. The metal cover 30 provides protection for the inner harness bundle 20 and conductivity.

Figure 9:
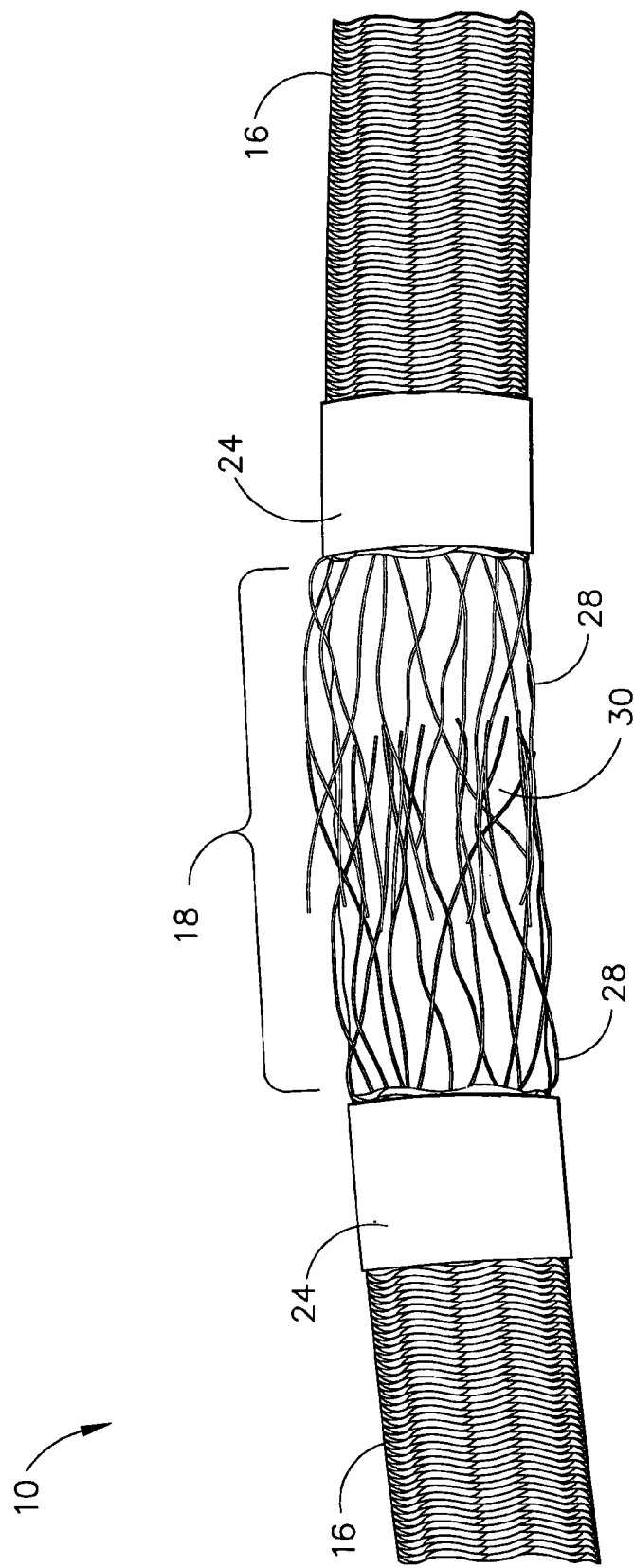
FIG. 9 illustrates a metal overbraid wiring harness where the metal strands are folded back over the metal tape.

After covering the repair area 18 with an electrically conductive material, the next step may be moving the metal overbraid back over the repair area 18. If the metal overbraid 16 has been spread into individual metal strands 28, the metal strands 28 may be folded back over the repair area 18 as in step six 50 and as illustrated in FIG. 9. If the strands are too long, they may be trimmed near the center. After the metal strands 28 are folded back over, the tape 24 (or any equivalent) may be carefully removed.

Figure 10:
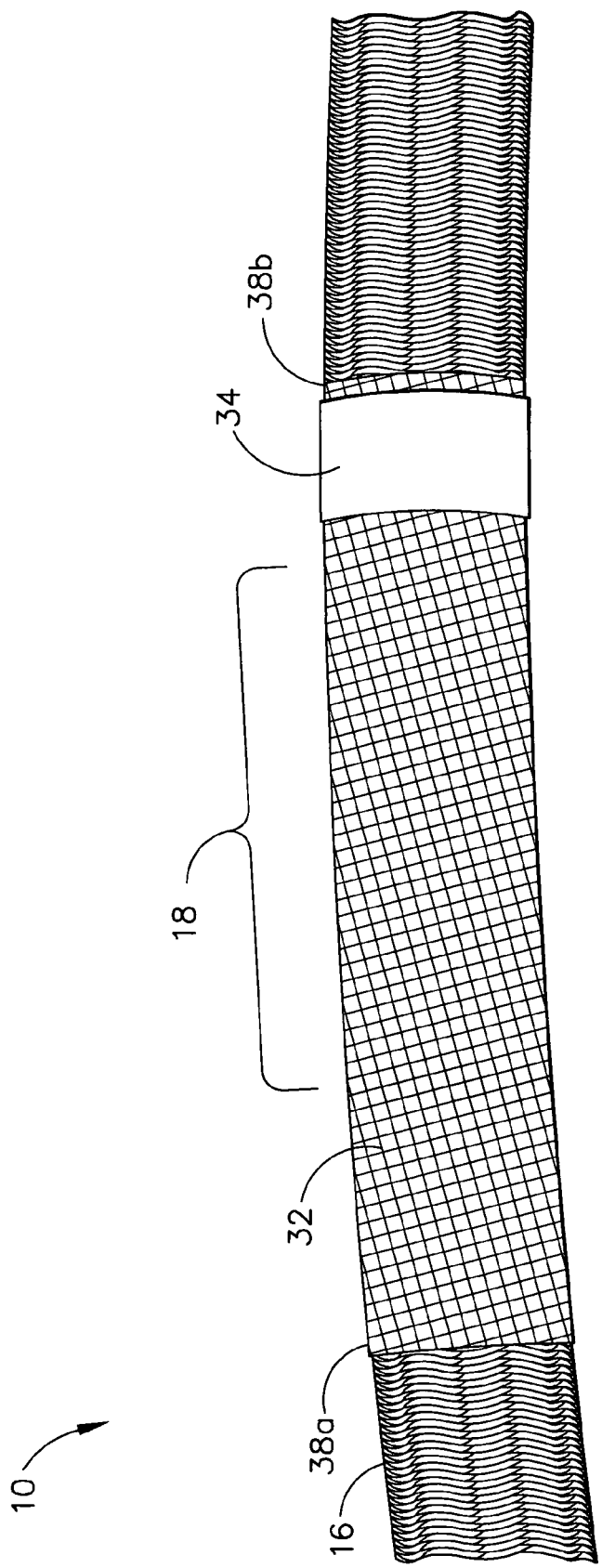
FIG. 10 illustrates a metal overbraid wiring harness where a wire mesh screen is placed over the repair area.

In the next step 54 the repair area 14 may be covered with wire screen mesh 32 which is secured to the metal overbraid wiring harness 10 (FIG. 10). The wire screen mesh 32 may be chosen so that once applied, it has the same visual density as the metal overbraid 16. Also, once applied, it may provide the same flexibility as the original overbraid. Moreover, the wire screen mesh 32 should have substantially similar conductivity as the metal overbraid 16. By substantially similar, it is meant that the wire screen mesh 32 should vary by no more than about 5% from the overbraid material. The wire screen mesh 32 may need to be temporarily secured to the metal overbraid wiring harness. The wire screen mesh 32 may be temporarily secured by overlapping the wire screen mesh 32 on itself to capture an end and/or by tape or other physical means. For example, fiberglass tape 34 may be used.

By way of non-limiting example, a 1 inch wide wire screen mesh 32 may be used. Starting at one end 38a of the repair area 18, the wire screen mesh 32 may be overlapped tightly on itself to capture the end. The mesh 32 may be tightly and firmly stretched while being wrapped around to completely cover the repair area 18. As the mesh 32 is wrapped around, it should overlap at least 50% of its width. It may be secured on the finishing end 38b with a wrap of fiberglass tape 34 (FIG. 10).

Figure 11:
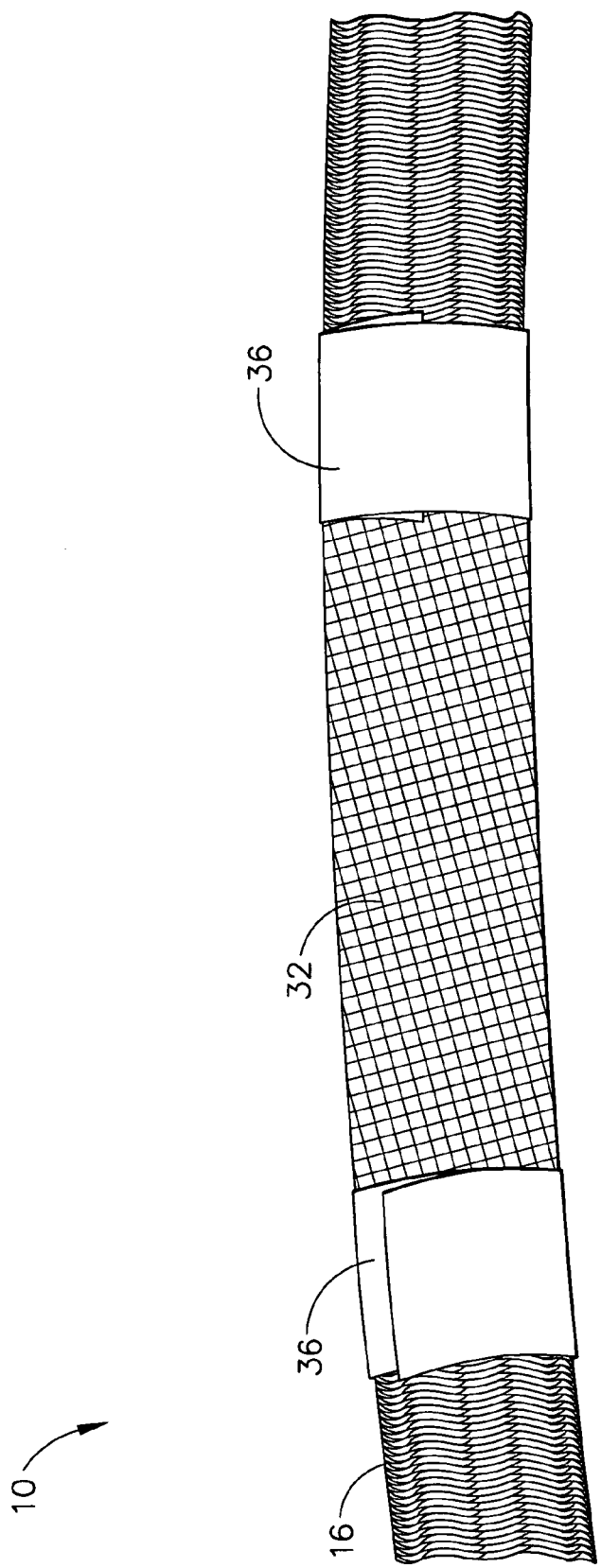
FIG. 11 illustrates a metal overbraid wiring harness where the wire screen mesh is secured to the metal overbraid.

In the final step 56 the mesh 32 may be secured to the wiring harness 10. Although heat shrink tape 36 is used illustratively in FIG. 11, any means may be used as long as a strong seal is formed so that the mesh remains secure under operating conditions for the wiring harness 10 and the conductivity of the wiring harness 10 is not affected. As illustrated in FIG. 11, heat shrink tape 36 may be centered over each end 38a,b of the wire screen mesh 32 and heated to form a seal. It may be desirable to have a heat shrink tape 36 with a high temperature range rating. The heat shrink tape 36 may have a temperature range rating of, by way of non-limiting example, from about 250° F. to about 500° F. Heat shrink tape 36 with a high temperature rating may be made of polytetrafluoroethylene, commonly known as Teflon®. A non-limiting example of a suitable heat shrink tape is Raychem TMS-WM shrink tape.

A metal overbraid wiring harness having a repaired damaged area in the metal overbraid, wherein the damaged area is in the single braid portion of the metal overbraid, is also provided. The damaged area may be repaired by the method comprising the steps of trimming the damaged area of the metal overbraid circumferentially around the harness, wrapping tape around the harness on both sides of the repair area, spreading the metal overbraid into metal strands from the repair area to the tape, folding back the metal strands away from the repair area and over the tape, covering the repair area with a metal cover wherein the metal cover covers the entire repair area, folding the metal strands over the metal cover, removing the tape from the overbraid harness, overlaying the repair are with a wire screen mesh wherein the metal strands are completely covered and securing the wire screen mesh to the overbraid harness. The damaged area may be an abrasion to or a hole in the metal overbraid.

After the damaged areas of the metal overbraid harness have been repaired, an insulation resistance test may be performed. The testing may be between mutually insulated contacts and between each contact and the connector shell to conform to the minimum resistance allowed for the harness. Likewise, the metal overbraid may be checked using a voltmeter across the repaired area. If the harness does not meet minimum standards, the repair may be redone. If the harness is still not optimal, then it should be removed and replaced.

The metal overbraid wiring harness may have more than one damaged area at any one time in the metal overbraid. More than one damaged area may be repaired as described above. It will be appreciated that the only limitation is the distance between the damaged areas. If the damaged areas are in close proximity, i.e. less than about 2 inches apart, it may be difficult to repair them. The repair of the metal wire overbraid may last for the lifetime of the harness. However, after a certain number of repairs the integrity of the harness may be questionable and the harness may be removed to be rebraided. While the number of repairs is limited by the harness itself, it may be desirable to have no more than four repairs in one metal overbraid wiring harness. The repaired metal overbraid wiring harness may have substantially the same flexibility and conductivity of an undamaged metal overbraid wiring harness.

It should be understood, of course, that the foregoing relates to exemplary embodiments of the invention and that modifications may be made without departing from the spirit and scope of the invention as set forth in the following claims.

We claims:

1. A method for repairing a metal overbraid of a metal overbraid wiring harness comprising the steps of:
   trimming a damaged area of the metal overbraid circumferentially around the metal overbraid wiring harness to expose a repair area;
   moving the metal overbraid away from the repair area;
   spreading the metal overbraid to produce individual metal strands;
   covering the repair area with an electrically conductive material;
   moving the individual metal strands over the electrically conductive material;
   overlaying the repair area with a wire screen mesh wherein the repair area is completely covered by the wire screen mesh; and
   securing the wire screen mesh to the metal overbraid wiring harness.

2. The method of claim 1, wherein the damaged area is in a part of the metal overbraid that is single braided.

3. The method of claim 1 wherein the repair area is from about 0.5 inches to about 1.0 inches.

4. The method of claim 1 wherein the damaged area is at least 0.5 inches from a double braid overlap.

5. The method of claim 1 wherein the metal overbraid is moved from about 0.5 inches to about 1.0 inches from both ends of the repair area.

6. The method of claim 1 wherein the metal overbraid is moved by spreading the metal overbraid and folding it back away from the repair area.

7. The method of claim 1 wherein the electrically conductive material has a substantially similar conductivity to the metal overbraid.

8. The method of claim 1 wherein the electrically conductive material is metal foil tape or tin foil.

9. The method of claim 1 wherein the electrically conductive material covers the entire repair area.

10. The method of claim 1 wherein overlaying the wire screen mesh comprises wrapping the mesh around the harness, wherein there is 50% overlap of the mesh.

11. The method of claim 10 wherein the wire screen mesh is about 1 inch in width.

12. The method of claim 1 wherein the wire screen mesh is secured on the metal overbraid by securing each end of the mesh with shrink tape.

13. The method of claim 12 wherein the shrink tape has a temperature rating of from about 250° F. to about 500° F.

14. The method of claim 13 wherein the shrink tape is made of polytetrafluoroethylene.

15. The method of claim 1 wherein overlaying the wire screen mesh provides an area that has similar flexibility and conductivity as the metal overbraid.

16. The method of claim 1 further comprising the step of wrapping tape around the harness from about 0.5 inches to about 1.0 inches from both ends of the repair area after trimming the damaged area.

17. The method of claim 16 further comprising the step of removing the tape before overlaying with the wire screen mesh.

* * * * *